United States Patent [19]
Carpenter et al.

[11] Patent Number: 6,126,257
[45] Date of Patent: Oct. 3, 2000

[54] TWO POSITION REMOVABLE QUICK LOAD TAPE CARTRIDGE MAGAZINE

[75] Inventors: Kipley T. Carpenter; Mike Alan Aschenbrenner, both of Westminster; Daniel James Plutt, Superior, all of Colo.

[73] Assignee: Storage Technology Corporation, Louisville, Colo.

[21] Appl. No.: 09/261,669

[22] Filed: Mar. 3, 1999

[51] Int. Cl.$^7$ ................................................. A47B 81/06
[52] U.S. Cl. .......................... 312/944; 312/212; 312/328; 211/41.12
[58] Field of Search ................................. 312/327, 328, 312/322, 323, 9.41, 9.42, 9.43, 9.44, 9.58, 9.61, 9.9; 211/1.3, 88.01, 44, 99, 170

[56] References Cited

U.S. PATENT DOCUMENTS

| | | | |
|---|---|---|---|
| 3,097,029 | 7/1963 | Lotz et al. | 312/322 |
| 3,439,967 | 4/1969 | Taylor | 312/307 |
| 4,314,734 | 2/1982 | Grunert | 312/322 |
| 4,441,771 | 4/1984 | Roesler | 312/322 |
| 4,487,461 | 12/1984 | Tindall et al. | 312/322 |
| 5,103,986 | 4/1992 | Marlow | 211/41.12 X |

FOREIGN PATENT DOCUMENTS 166684  5/1955  Australia .................................. 211/1.3

*Primary Examiner*—Peter M. Cuomo
*Assistant Examiner*—Michael J. Fisher
*Attorney, Agent, or Firm*—Brooks & Kushman P.C.

[57] ABSTRACT

An apparatus for mounting a magazine, containing multiple data cartridges, in a cartridge access port of an automated library. The magazine contains multiple cam followers that engage multiple cam profiles inside the cartridge access port. These cam followers and cam profiles allow the magazine to be positioned vertically for normal operation, and horizontally for installation and removal of individual cartridges. Each cam profile has an open end to allow the magazine to be completely removed from the cartridge access port. Cam profiles are established by grooves in the side walls of the cartridge access port, or by ridges protruding from those side walls. The cam followers are pins protruding from the sides of the magazine. In the alternative, the cam followers may be mounted inside the cartridge access port while the cam profiles are established on the magazine.

17 Claims, 5 Drawing Sheets

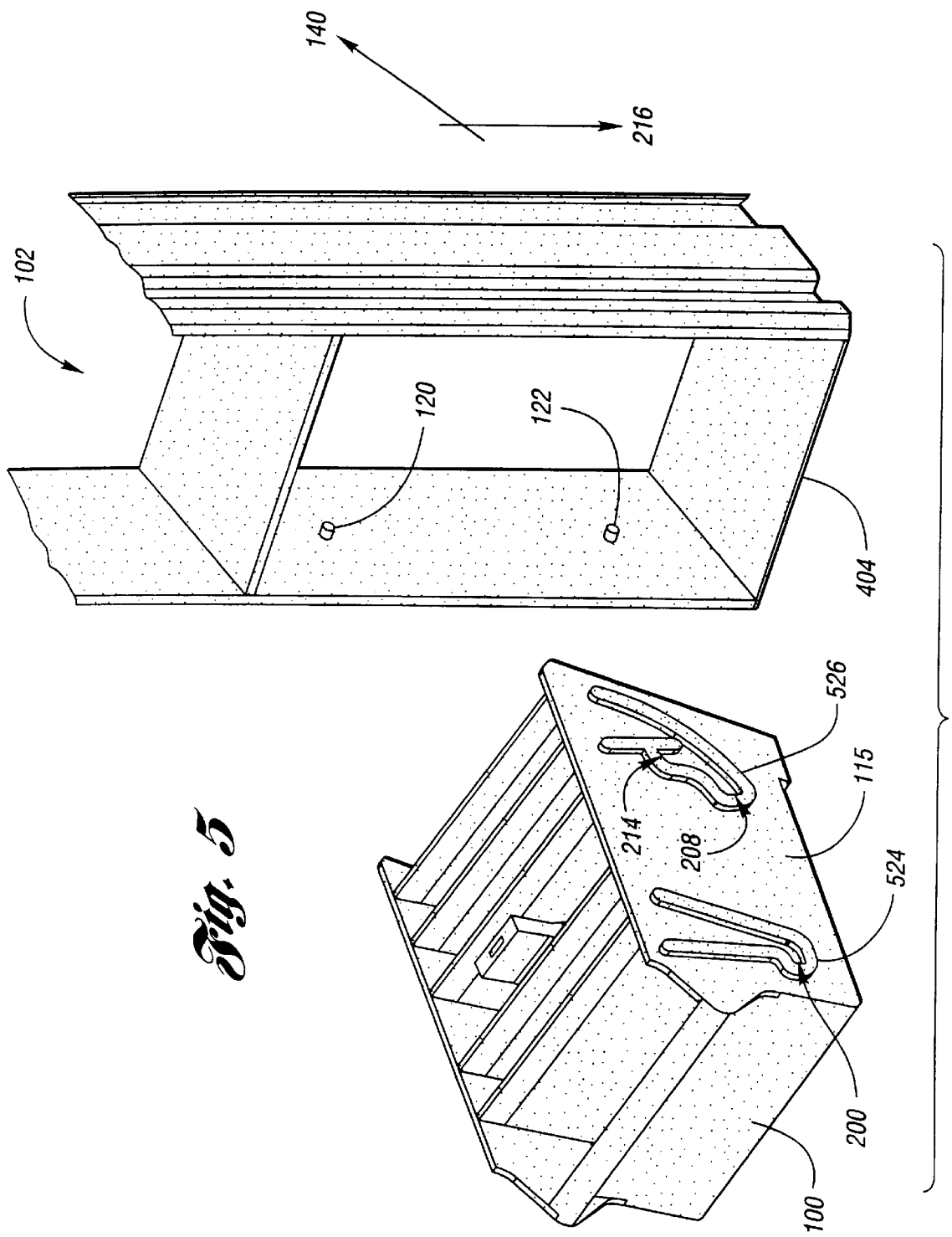

TWO POSITION REMOVABLE QUICK LOAD TAPE CARTRIDGE MAGAZINE

TECHNICAL FIELD

The present invention relates to the field of a cartridge magazine mounting apparatus having at least two cam followers that engage at least two cam profiles to hold the magazine inside an access port in an operational position and in a user accessible position. The apparatus also allows the magazine to be completely removed from the access port.

BACKGROUND ART

Automated tape libraries are a useful way of storing large amounts of information. Data is stored on dozens to hundreds of tape cartridges within the library. Robotic mechanisms move about the library moving cartridges from their storage slots to and from tape drives where the information can be accessed. The cartridges provide a convenient way to add new and remove blocks of information to and from the library. New blocks of prerecorded information are added to the library by inserting a new cartridge into an empty slot in the library and informing the library catalog of the new cartridge's location. Blocks of existing data can be removed for maintenance or archival by removing an existing cartridge.

Various mounting techniques have been used to accommodate the competing needs of the human users and robotic mechanisms to access the cartridges. In simple designs the users and robotic mechanisms access the cartridges and magazines from the same direction. This approach requires the robotic mechanisms to shut down while the user is inside the library to avoid man-machine collisions. More complicated library designs provide a Cartridge Access Port (CAP) that provide the users and robotic mechanisms two independent physical access paths to the same cartridge. Using the CAP approach, the robotic mechanisms access the cartridges from inside the library while the users access the same cartridges from the outside. This allows the robotic mechanisms to continue operating while a user is installing or removing cartridges. A drawback of this approach is that the user sees the cartridges from the tape side, not the label side. The user cannot determine if the proper cartridge is in the proper slot merely by looking. The user must remove the cartridge from the slot and turn it around to read the label. Finding a misplaced cartridge by this approach can be time consuming.

In larger tape libraries it is a common practice to group tape cartridges together into magazines. Each magazine allows the user to handle several cartridges simultaneously while always presenting the label side of the cartridges to the user. Using magazines, several cartridges may be added or removed from the library simultaneously. Magazines also allow cartridges to be added or removed individually.

The mounting apparatus used in a CAP approach must provide ease of magazine installation and removal by the users while providing accurate magazine positioning for the sake of the robotic mechanisms. One current mounting approach hangs the magazine from a rod inside the CAP. With this method, the user can hook and unhook the magazine to and from the rod using one hand on a handle provided on the front of the magazine. Magazine positioning is determined by the rod height, the CAP walls, and a closeable door on the user's side of the CAP.

In general, the existing mounting apparatuses work best when the magazines themselves are being installed and removed from the CAP. However, the existing apparatuses create problems for the user who wishes to install or remove more than one cartridge. As stated before, the magazine can be installed and removed with one hand. This leaves the users with a choice of inserting and removing the cartridges to and from the magazine with the free hand, or find a table to set the magazine down. Holding the magazine in one hand and manipulating the cartridges in the other is cumbersome. It also increases the potential for the users to drop and damage cartridges, or even the entire magazine. Moving to a table allows the user to use both hands to manipulate the cartridges, but it increases the time required to complete the task.

A preferred mounting apparatus would allow the magazine to be installed and completely removed from the CAP as the current apparatuses allow. It would also allow the magazine to be partially removed from, and yet still supported by the CAP so that the user can let go. Finally, from this partially removed position, the magazine must be oriented such that the user can easily insert and remove individual cartridges using both hands.

DISCLOSURE OF INVENTION

The present invention is an apparatus for mounting a magazine, containing multiple data cartridges, in a Cartridge Access Port (CAP) of an automated library. The magazine contains multiple cam followers that engage multiple cam profiles inside the CAP. These cam followers and cam profiles allow the magazine to be oriented vertically in a locked position for normal operation, and horizontally in a user accessible position for installation and removal of individual cartridges. Each cam profile has an open end on the user's side of the CAP that allows the cam followers to exit the cam profiles, permitting the magazine to be completely removed from the CAP. The cam followers are pins protruding from the sides of the magazine. The cam profiles are grooves in the walls of the CAP, or ridges protruding from those walls. Alternatively, the cam followers may be mounted inside the CAP while the cam profiles are established on the magazine.

Accordingly, it is an object of the present invention to provide a mounting apparatus having at least two cam followers that engage at least two cam profiles. The cam followers and cam profiles are shaped to hold a magazine in a locked position within a port, hold the magazine in a user accessible position partially within the port, and allow the magazine to be completely removed from the port.

Another object of the present invention is to provide a mechanical stop on the magazine and a stop abutment on the port to fix the user accessible position with respect to the port.

Still another object is to orient the magazine approximately vertically when in the locked position, and approximately horizontally when in the user accessible position.

These and other objects, features and advantages will be readily apparent upon consideration of the following detailed description in conjunction with the accompanying drawings.

BRIEF DESCRIPTION OF DRAWINGS

FIG. 5 is a perspective view of a magazine with ridge type cam profiles and a cartridge access port with pin type cam followers.

BEST MODE FOR CARRYING OUT THE INVENTION

Figure 1:
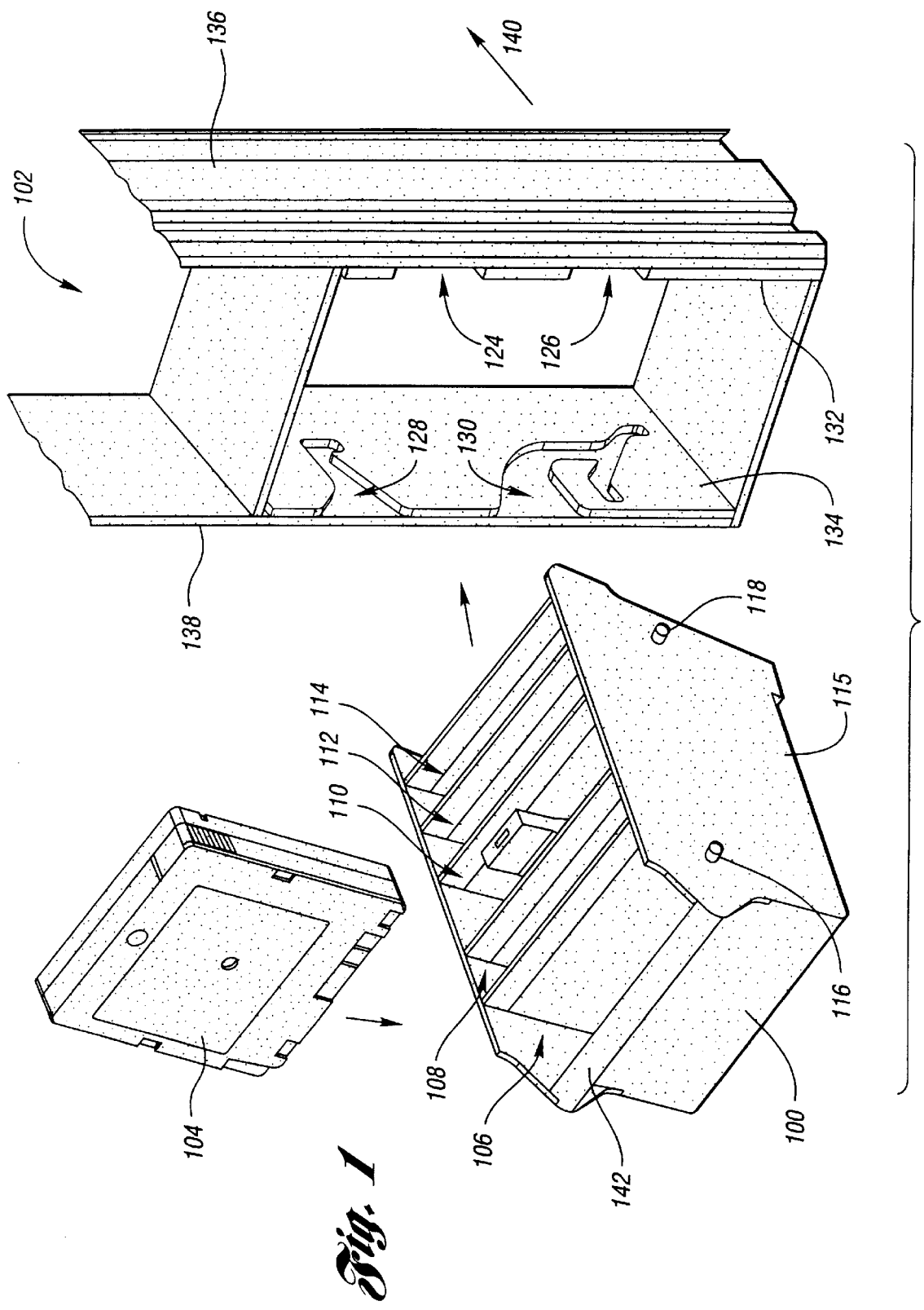
FIG. 1 is a perspective view of a magazine and cartridge access port that implements the present invention.

FIG. 1 is a perspective view of the preferred embodiment of the present invention. In this view the magazine 100 is completely removed from the Cartridge Access Port (CAP) 102 of a library. To install a cartridge 104 in the CAP 102 from this position, the cartridge 104 is first inserted into one of several slots 106–114 in magazine 100. Next, magazine 100 is mounted in CAP 102 in a locked position making the cartridge 104 available to a robotic mechanism (not shown) inside the library.

Mounting of magazine 100 inside CAP 102 is accomplished with four cam followers and four cam profiles respectively. The cam follower are in the form of pins 116 and 118 mounted on a first side 115 of the magazine, and two similar pins 120 and 122 (not shown) mounted on the opposite side of the magazine. The cam profiles are provided by grooves 124–130 formed in plates 132 and 134. Plates 132 and 134 are mounted to the two opposing side walls 136 and 138 respectively that make up CAP 102. Alternatively, the plates 132 and 134 may be an integral part of the side walls 136 and 138.

Figure 4:
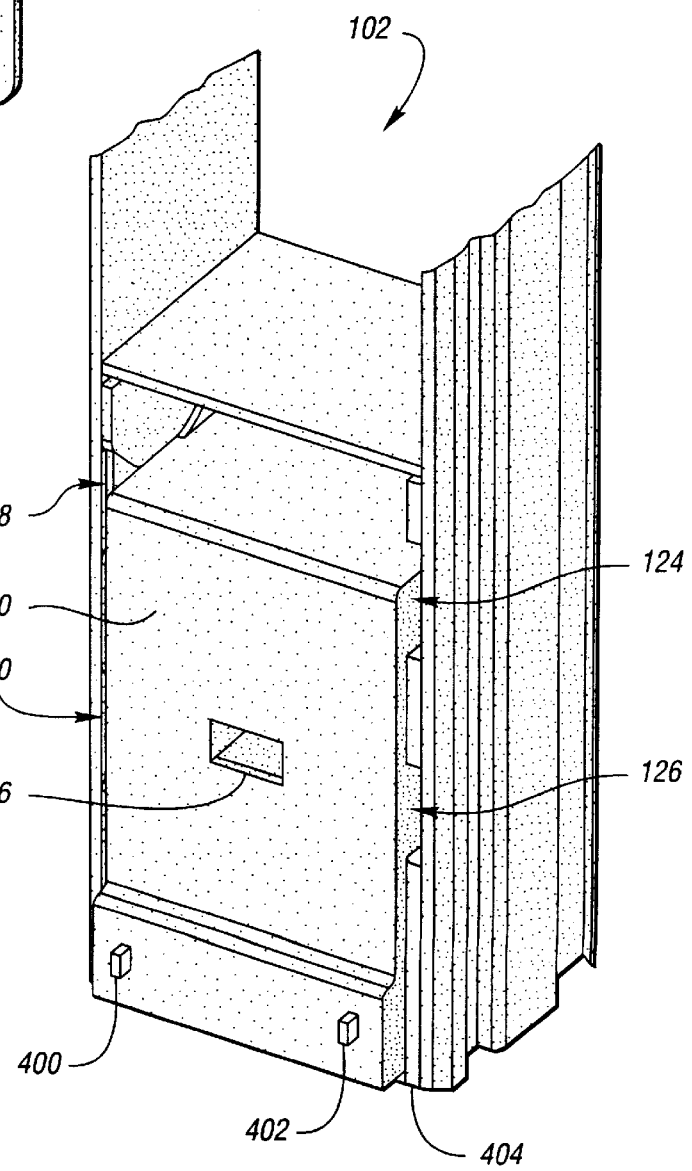
FIG. 4 is a perspective view of the magazine installed in the cartridge access port in the locked position.

Grooves 124–130 are shaped to allow magazine 100 to be mounted in two different positions. Magazine 100 is oriented vertically in the locked position with the cartridges facing the inside of the library, shown as direction 140. This is the normal operational position for magazine 100. When magazine 100 is in the locked position, the two pins 116 and 120 nearest the top handle 142 reside in grooves 124 and 128 respectively, while pins 118 and 122 reside in grooves 126 and 130 respectively. FIG. 4 shows the magazine 100 in the locked position within CAP 102.

Figure 3:
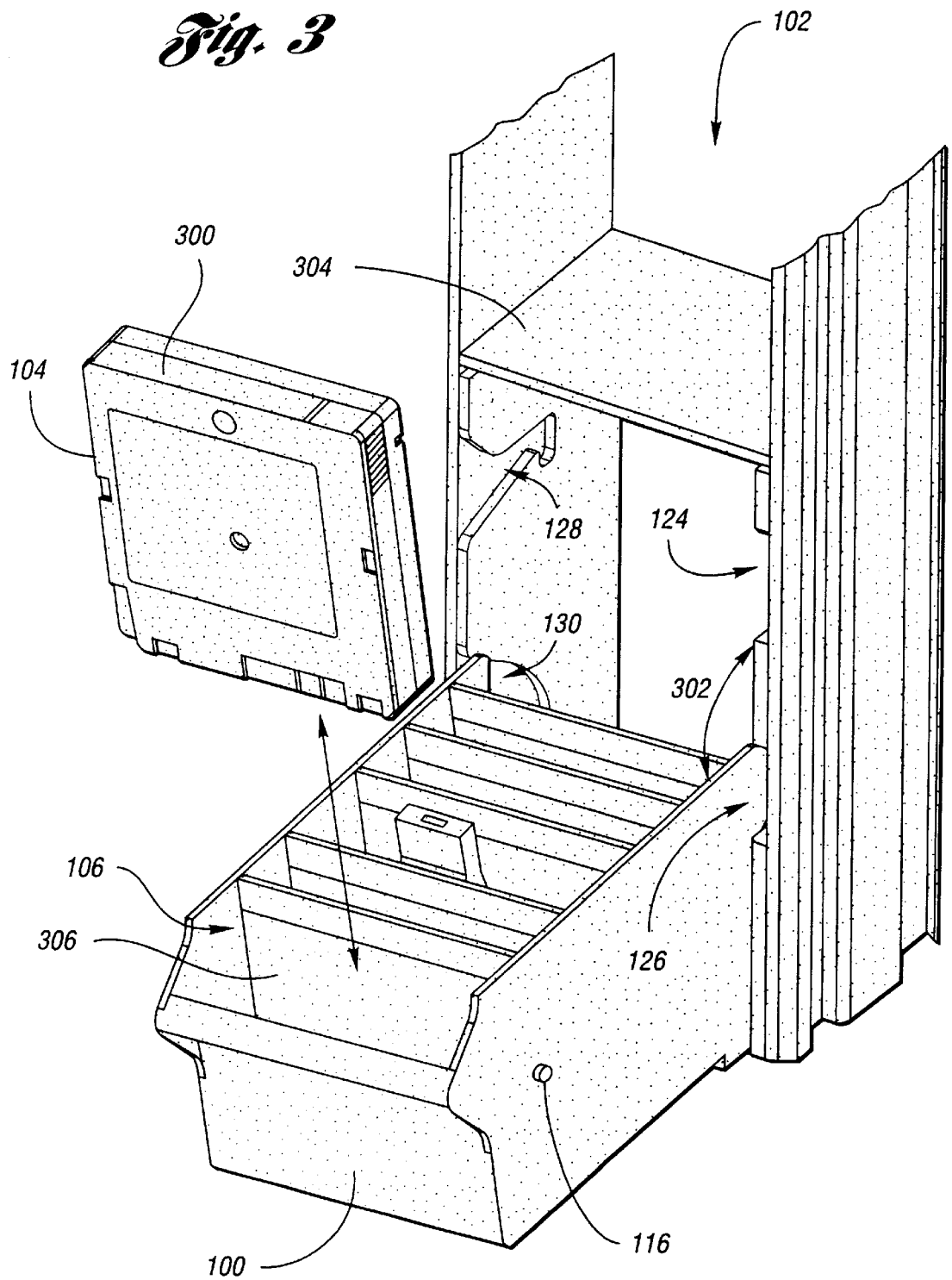
FIG. 3 is a perspective view of the magazine installed in the cartridge access port in the user accessible position.

Grooves 124–130 also allow magazine 100 to be mounted in a horizontal orientation to allow a user to access the cartridge 104. This horizontal orientation is referred to as a user accessible position. With magazine 100 in the user accessible position, pins 116 and 120 are outside grooves 124 and 128, while pins 118 and 122 reside in grooves 126 and 130 respectively. FIG. 3 shows magazine 100 in the user accessible position.

Figure 2:
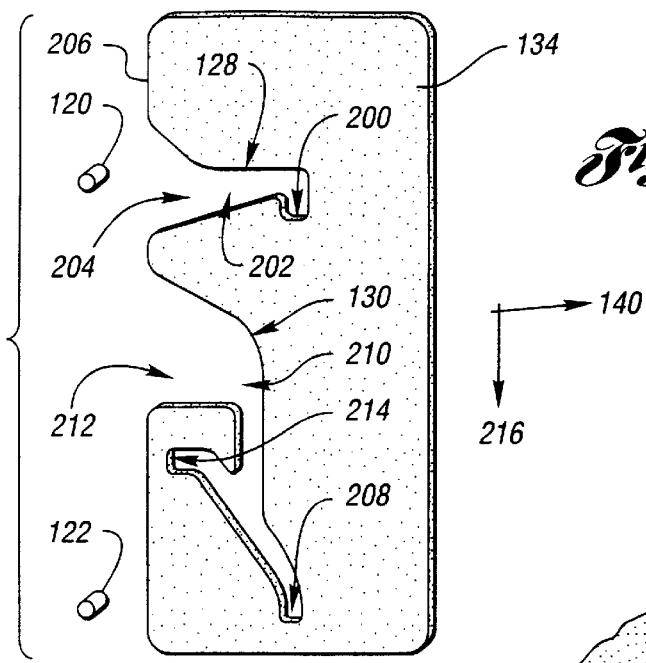
FIG. 2 is a perspective view of a plate having groove type cam profiles.

FIG. 2 is a perspective view of plate 134 and pins 120 and 122. Groove 128 in plate 134 has several components. The first component is a lock seat 200 that supports magazine 100 in the locked position. Lock seat 200 connects to a passage 202 that leads to an opening 204 in a side 206 of plate 134. Likewise, groove 130 has a lock seat 208 and a passage 210 leading to an opening 212 in the side 206 of plate 134. Groove 130 also has an access seat 214 that supports magazine 100 in the user accessible position. Grooves 128 and 130 can be formed partially through the thickness of plate 134, or completely through as shown in the figure. Plate 132 and grooves 124 and 126 are mirror images of plate 134 and grooves 128 and 130.

To install magazine 100 in the locked position inside CAP 102, the user manipulates magazine 100 to pass pin 122 into opening 212 of groove 130. Referring back to FIG. 1, pin 118 is simultaneously passed into a similar opening in groove 126. Magazine 100 is then rotated clockwise (as seen from the perspective of FIG. 2) directing pin 122 down passage 210 and bringing pin 120 through opening 204 of groove 128. Referring back to FIG. 1, pin 118 simultaneously moves down a similar passage in groove 126 while pin 116 enters the opening in groove 124. Magazine 100 is then moved toward the inside of the library, shown as direction 140, and downward, shown as direction 216, until pins 120 and 122 are seated in lock seats 200 and 208 respectively. At this point the user can release magazine 100. Gravity holds pins 120 and 122 in lock seats 200 and 208 respectively, and pins 116 and 118 in the lock seats in grooves 124 and 126 respectively.

Removal of magazine 100 from CAP 102 is accomplished using the installation procedures in reverse. Magazine 100 is lifted a short distance in a direction opposite direction 216 raising pins 120 and 122 out of lock seats 200 and 208 respectively. Magazine 100 is then rotated counterclockwise (as seen from the perspective of FIG. 2) toward the user to move pin 120 through passage 202 and out opening 204. The user continues to lift and rotate the magazine 100 to move pin 122 up passage 210 and out opening 212 in groove 130.

Magazine 100 can also be moved from the locked position to the user accessible position to remove cartridge 104 or remove and install other cartridges. The user changes positions of magazine 100 by first lifting magazine 100 in a direction opposite the direction 216. Magazine 100 is then rotated counterclockwise (as seen from the perspective of FIG. 2) to cause pin 120 to leave groove 128 through opening 204. Next, the user pulls magazine 100 toward himself, the direction opposite the direction 140. As the user pulls that magazine 100 toward himself, pin 122 is moved into contact with access seat 214. Finally, the user continues to rotate magazine 100 in the counterclockwise direction until a mechanical stop reaches a stop abutment to hold magazine 100 in approximately horizontally. The mechanical stop and stop abutment are described later in FIG. 4. Magazine 100 is returned to the locked position by reversing the procedures just described.

Magazine 100 may be removed from the CAP 102 directly from the user accessible position. The user accomplishes this by rotating the magazine clockwise and pushing in direction 140 to move pin 122 out of the access seat 214. Magazine 100 is then lifted in the direction opposite direction 216 directing pin 122 up passage 210. Finally, the user pulls the magazine 100 toward himself, the direction opposite direction 140, until pin 122 leaves groove 130 through opening 212. These steps may also be reversed to place magazine 100 directly into the user accessible position from outside the CAP 102.

FIG. 3 is a perspective view of magazine 100 in the user accessible position with respect to the CAP 102. Pin 118 (not shown) and pin 122 (not shown) reside in grooves 126 and 130 respectively. Pin 116 and pin 120 (not shown) reside outside grooves 124 and 128. In the preferred embodiment, magazine 100 is oriented approximately horizontally. This orientation makes it easy for the user to install or remove cartridges. It also orients the cartridges with their labels facing the user, as shown with cartridge 104 and its label 300. This feature helps insure that the user is dealing with the correct cartridge. Other orientations may be selected for the user accessible position within practical limits. As the angle of the user accessible position, shown as angle 302, is decreased below 90 degrees, roof 304 of the CAP 102 starts to interfere with inserting and removing the cartridges from the magazine 100. As the angle 302 of the user accessible position is increased well beyond 90 degrees, then the cartridges will pull away from the floors of the slots under the influence of gravity, as shown by cartridge 104 and floor 306 in slot 106. This is not a desirable condition.

FIG. 4 is a perspective view of magazine 100 in the locked position with respect to CAP 102. All four pins 116–122 (none shown in FIG. 4) reside in grooves 124–130 respectively in the locked position. From this view, a pair of mechanical stops 400 and 402 can be seen near the bottom of magazine 100. When magazine 100 is rotated counterclockwise (as seen from the perspective of FIG. 4), mechanical stops 400 and 402 come into contact with floor 404 of the CAP 102. Floor 404 acts as a stop abutment to halt the counterclockwise rotation of the magazine 100 defining the user accessible position. With mechanical stops 400 and 402 abutting floor 404, the magazine 100 is supported by the CAP 102 allowing the user to let go of a back handle 406 and the top handle 142 (not shown in FIG. 4). Both of the user's hands are now free to handle the cartridges.

Figure 6:
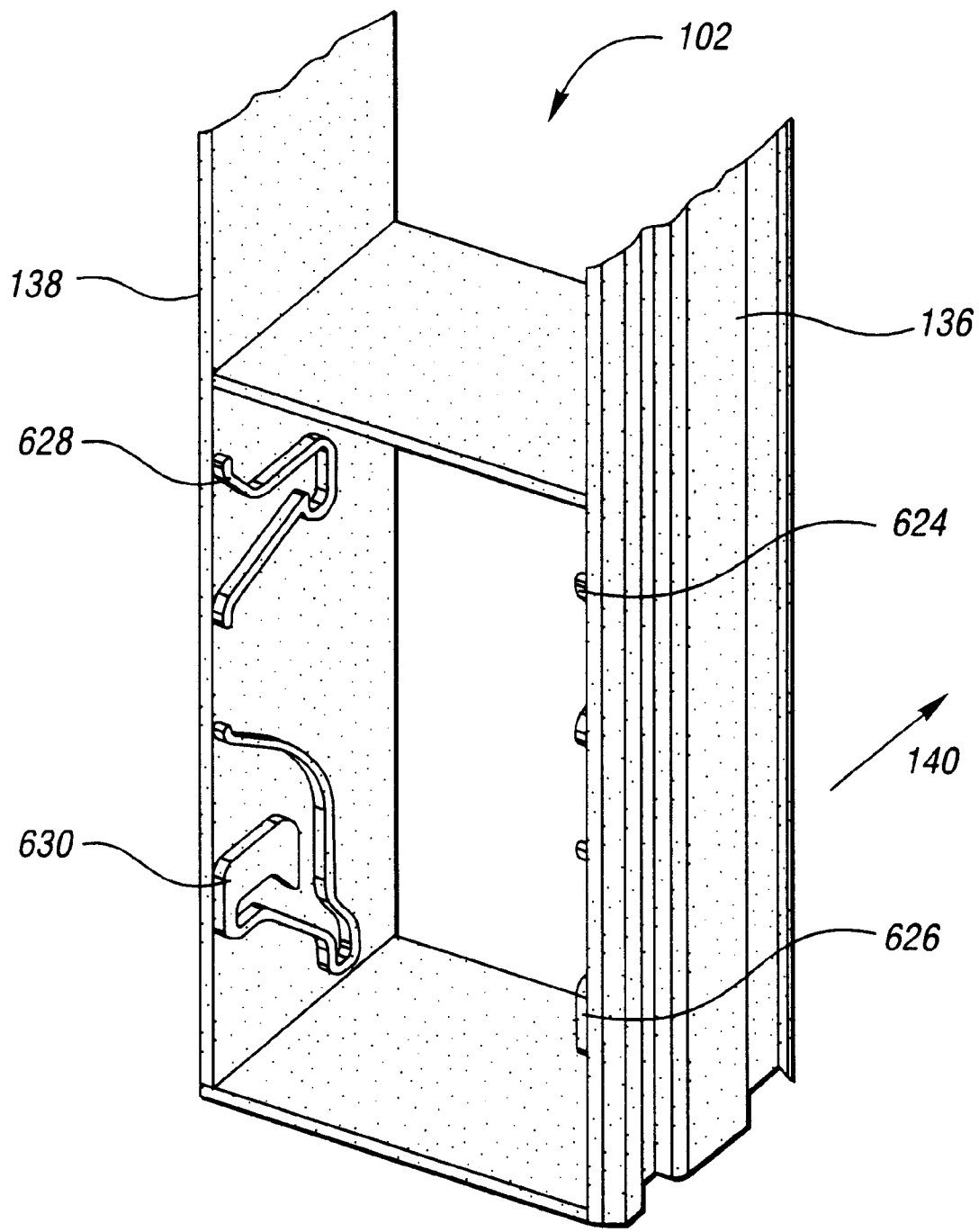
FIG. 6 is a perspective view of an alternative embodiment of the cam profiles in the cartridge access port.

FIG. 5 is an alternative embodiment of the present invention. One variation shown in this figure is that the cam profiles 524, 526, 528 (not shown) and 530 (not shown) are created by ridges protruding outward from the first side 115 and the opposite side (not shown) of magazine 100. This approach allows the cam profiles 524–530 to be formed without the full mass of plate 134 required for the cam profiles formed by grooves 124–130 in FIG. 2. Similarly, the cam profiles 624, 626, 628 and 630 may also be created by ridges protruding out of side walls 136 and 138, as shown in FIG. 6.

Another variation shown in FIG. 5 is that cam profiles 524–530 are on magazine 100 while the cam followers, pins 116 (not shown), 118 (not shown), 120 and 122, are provided inside CAP 102. Note that cam profiles 524–530 are inverted in this arrangement as comparted to the grooves 124–130 in FIG. 2. When magazine 100 is in the locked position, gravity pulls the lock seats 200 and 208 in direction 216 onto pins 124–130. When magazine 100 is in the user accessible position, the access seats 214 are pulled against pins 118 and 124 as gravity forces magazine 100 to pivot about floor 404.

Other configurations of cam profiles, cam followers, magazines, and CAP's are possible within the scope of the present invention. For example, the CAP and magazine may be designed to hold more than five cartridge slots in a single column. As more slots are added, the weight of the magazine increases. To account for the added weight, additional sets of cam profiles and cam followers may be added to spread the load. In another example, the magazine may have more than one column of cartridge slots. Extra cam profiles and cam followers may be added to multiple columned magazines in-between the columns. A magazine having two slot columns may have six pins, two on each outer side of each column and two more in-between the columns. The CAP that receives this magazine would have three plates of the type shown in FIG. 2. In another configuration, the two-column magazine may only have the two pins found in-between the columns.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An apparatus for mounting a magazine in a port comprising:

at least two cam followers disposed on the magazine; and at least two cam profiles disposed inside the port, wherein each cam profile of the at least two cam profiles has an opening operative to receive one cam follower of the at least two cam followers respectively and a first seat operative to seat the respective cam follower while the magazine is in a locked position with respect to the port, and a first cam profile of the at least two cam profiles also has a second seat operative to seat a first cam follower of the at least two cam followers while the magazine is in a user accessible position with respect to the port, the at least two cam followers being arranged so that while the magazine is in the locked position each one cam follower of the at least two cam followers is seated in the first seat of a respective one cam profile of the at least two cam profiles, and while the magazine is in the user accessible position the first cam follower is seated in the second seat of the first cam profile and a second cam follower of the at least two cam followers is disposed outside of the at least two cam profiles.

2. The apparatus of claim 1 further comprising:

at least one mechanical stop disposed on the magazine; and a stop abutment disposed on the port in a position to be engage by the at least one mechanical stop when the magazine is in the user accessible position.

3. The apparatus of claim 2 wherein the seating of the one cam follower of the at least two cam followers in the second seat, and the engagement of the at least one mechanical stop with the stop abutment supports the magazine approximately horizontally in the user accessible position.

4. The apparatus of claim 1 wherein the seating of the at least two cam followers in each respective first seat supports the magazine approximately vertically in the locked position.

5. The apparatus of claim 1 wherein the magazine has two opposing sides and the port has two opposing side walls, and wherein the at least two cam followers are four cam followers, two cam followers of the four cam followers being disposed on each side of the two opposing sides of the magazine respectively, and wherein the at least two cam profiles are four cam profiles, two cam profiles of the four cam profiles being disposed on each side wall of the two opposing side walls of the port respectively.

6. The apparatus of claim 5 wherein the four cam followers are four pins protruding from the two opposing sides of the magazine.

7. The apparatus of claim 5 wherein the four cam profiles are grooves provided in the two opposing side walls of the port.

8. The apparatus of claim 5 wherein the four cam profiles are ridges protruding from the two opposing side walls of the port.

9. An apparatus for mounting a magazine in a port, wherein the magazine has two opposing sidewalls and the port has two opposing sidewalls, the apparatus comprising:

four cam followers disposed on the magazine, wherein a first and a second cam follower of the four cam followers are disposed on a first sidewall of the two opposing sidewalls of the magazine, and a third and a fourth cam follower of the four cam followers are disposed on a second sidewall of the two opposing sidewalls of the magazine; and four cam profiles disposed inside the port, wherein a first and a second cam profile of the four cam profiles are disposed on a first sidewall of the two opposing sidewalls of the port, a third and a fourth cam profile of the four cam profiles are disposed on a second sidewall of the two opposing sidewalls of the port, each of the four cam profiles having an opening and a first seat, and each of the first and the third cam profiles also having a second seat;

the four cam followers being arranged so that while the magazine is in a locked position with respect to the port the first, the second, the third and the fourth cam followers are seated in the first seat of the first, the second, the third and the fourth cam profiles respectively, and while the magazine is in a user accessible position with respect to the port the first and the third cam followers are seated in the second seat of the first and the third cam profiles respectively and the second and the fourth cam followers are disposed outside of the four cam profiles.

10. An apparatus for mounting a magazine in a port comprising:

at least two cam followers disposed inside the port; and at least two cam profiles disposed on the magazine, wherein each cam profile of the at least two cam profiles has an opening operative to receive one cam follower of the at least two cam followers respectively, and a first seat operative to seat the respective cam follower while the magazine is in a locked position with respect to the port, and a first cam profile of the at least two cam profiles also has a second seat operative to seat a first cam follower of the at least two cam followers while the magazine is in a user accessible position with respect to the port, the at least two cam followers being arranged so that while the magazine is in the locked position each one cam follower of the at least two cam followers is seated in the first seat of a respective one cam profile of the at least two cam profiles, and while the magazine is in the user accessible position the first cam follower is seated in the second seat of the first cam profile and a second cam follower of the at least two cam followers is disposed outside of the at least two cam profiles.

11. The apparatus of claim 10 further comprising:

at least one mechanical stop disposed on the magazine; and a stop abutment disposed on the port in a position to be engage by the at least one mechanical stop when the magazine is in the user accessible position.

12. The apparatus of claim 10 wherein the seating of the one cam follower of the at least two cam followers in the second seat, and the engagement of the at least one mechanical stop with the stop abutment supports the magazine approximately horizontally in the user accessible position.

13. The apparatus of claim 10 wherein the seating of the at least two cam followers in each respective first seat supports the magazine approximately vertically in the locked position.

14. The apparatus of claim 10 wherein the magazine has two opposing sides and the port has two opposing side walls, and wherein the at least two cam followers are four cam followers, two cam followers of the four cam followers being disposed on each side wall of the two opposing side walls of the port respectively, and wherein the at least two cam profiles are four cam profiles, two cam profiles of the four cam profiles being disposed on each side of the two opposing sides of the magazine respectively.

15. The apparatus of claim 14 wherein the four cam followers are four pins protruding from the two opposing side walls of the port.

16. The apparatus of claim 14 wherein the four cam profiles are grooves in the two opposing sides of the magazine.

17. The apparatus of claim 14 wherein the four cam profiles are ridges protruding from the two opposing sides of the magazine.

* * * * *